United States Patent [19]

Price

[11] Patent Number: 5,409,281
[45] Date of Patent: Apr. 25, 1995

[54] WEED PULLER WITH PLUG EJECTING MECHANISM

[75] Inventor: Chester Price, PO279 300 Chelsea St., Forked River, N.J. 08731

[73] Assignee: Chester Price, Forked River, N.J.

[21] Appl. No.: 233,641

[22] Filed: Apr. 26, 1994

[51] Int. Cl.⁶ ............................................. A01B 1/16
[52] U.S. Cl. .................................... 294/50; 294/50.7
[58] Field of Search ...................... 294/50, 50.5–50.7, 294/60, 61; 30/128, 130; 73/864.44, 864.45; 111/92, 96, 99, 101, 106, 115; 172/19, 21, 22; 175/20, 313; 222/391; 254/132

[56] References Cited

U.S. PATENT DOCUMENTS

| | | | |
|---|---|---|---|
| 1,335,878 | 4/1920 | Cronowert | 294/50.5 |
| 2,635,001 | 4/1953 | Slinkman | 294/50.5 |
| 3,273,930 | 9/1966 | Gottfried | 294/50.5 X |
| 3,506,296 | 4/1970 | Nelson | 294/50.7 X |
| 4,072,254 | 2/1978 | Cox | 222/391 |
| 4,509,662 | 4/1985 | Weiss | 222/391 |
| 4,572,409 | 2/1986 | Finnegan | 222/391 |
| 4,986,588 | 1/1991 | Price | 294/50.7 |
| 5,004,283 | 4/1991 | Sullivan | 294/50 X |
| 5,005,888 | 4/1991 | Parks et al. | 294/50 |

FOREIGN PATENT DOCUMENTS

| | | | |
|---|---|---|---|
| 331051 | 10/1935 | Italy | 294/50.5 |
| 11337 | of 1907 | United Kingdom | 294/50.5 |
| 865902 | 4/1961 | United Kingdom | 294/50.7 |
| 1360983 | 7/1974 | United Kingdom | 294/50.5 |

*Primary Examiner*—Johnny D. Cherry
*Attorney, Agent, or Firm*—Herbert L. Lerner; Laurence A. Greenberg

[57] ABSTRACT

A weed pulling apparatus has a tubular member and a handle. The end of the tubular member distally from the handle is inserted into the ground around a weed for forming a weed plug. A plunger rod is longitudinally disposed inside the tubular member and it is axially movable within the tubular member. A weed plug ejecting mechanism includes a lever pivotally mounted at the handle, a lock plate having an opening formed therein through which the plunger rod projects and a plunger head carried on the first end of the plunger rod. The lever and the lock plate cooperate such that, when the lever is pivoted, the lock plate forces the plunger rod downwardly in the tubular member and the plunger head ejects the weed plug from the tubular member.

5 Claims, 1 Drawing Sheet

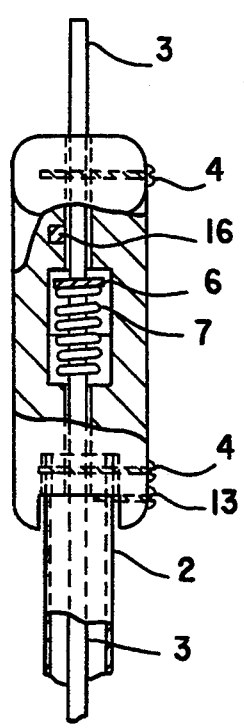
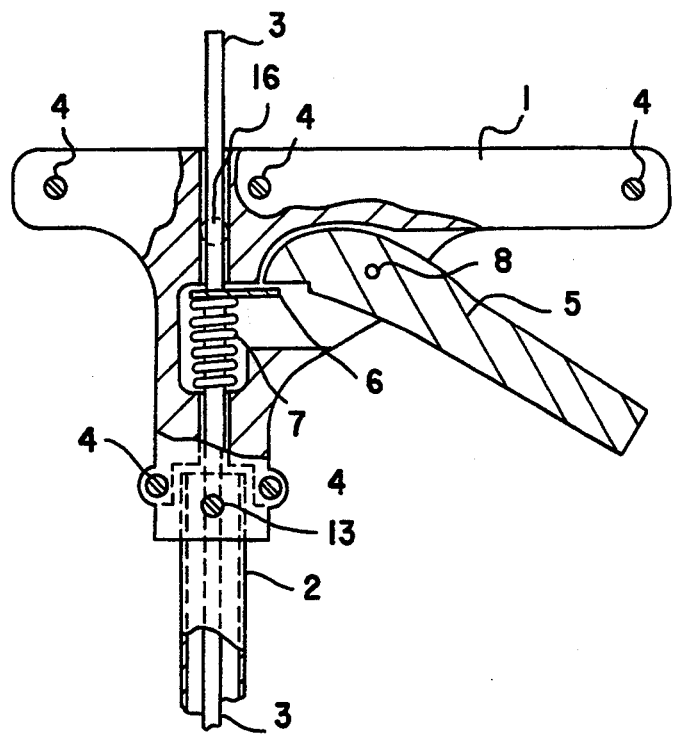
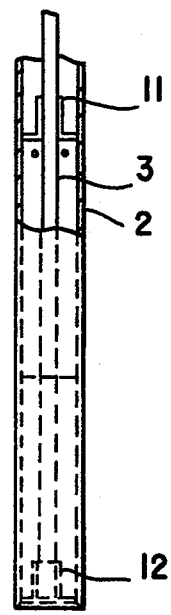
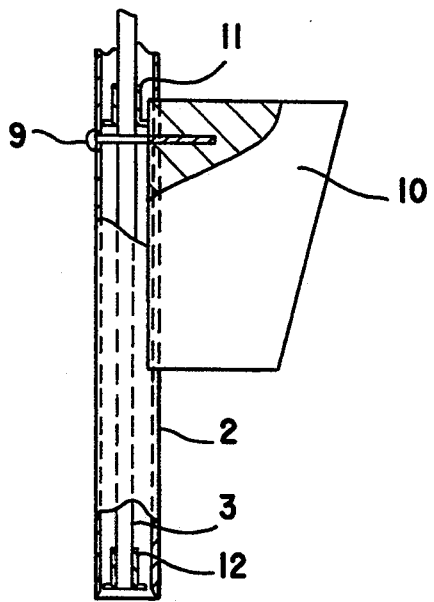
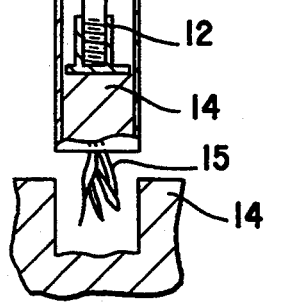
FIG.2    FIG.1    FIG.3

WEED PULLER WITH PLUG EJECTING MECHANISM

BACKGROUND OF THE INVENTION

1. Field of the Invention

The invention relates to a weed pulling apparatus of the type having a cylindrical tubular member and a weed plug ejecting mechanism.

2. Description of the Related Art

Weed pullers of this general type are disclosed in my prior U.S. Pat. Nos. 4,822,088 and 4,986,588. The latter discloses a weed puller with a tubular member with a lower end which is forced into the ground by stepping on a foot lever. The tube surrounds the weed and the weed plug thus formed is extracted from the ground. A spring loaded plunger rod is then released by means of a handle bar, which automatically forces the weed plug out of the tube and prepares the apparatus for another weed pulling operation.

Similar types of weed pullers are disclosed in U.S. Pat. No. 5,004,283 to Sullivan and U.S. Pat. No. 5,005,888 to Parks et al. The weed plug is formed by inserting four spikes or prongs into the ground around the weed. After the prong assembly has been rotated, as for instance with the torque bar of Sullivan, the weed is extracted from the ground and then ejected from the assembly. The ejecting mechanisms are spring-loaded.

It has been found that the spring-loaded ejecting mechanisms of the prior art are not always advantageous, as the force of ejection is solely defined by the spring force and the length of the weed plug.

SUMMARY OF THE INVENTION

It is accordingly an object of the invention to provide an improved weed puller with a plug ejecting mechanism, which overcomes the hereinafore-mentioned disadvantages of the heretofore-known devices of this general type with all the conveniences of my earlier weed pullers and which provides for an improved, safe and convenient weed ejecting mechanism.

With the foregoing and other objects in view there is provided, in accordance with the invention, a weed pulling apparatus, comprising:

- a tubular member having a first end adapted to be inserted into the ground around a weed for forming a weed plug, and a second end;
- a plunger rod longitudinally disposed inside the tubular member and being axially movable within the tubular member, the plunger rod having a first end associated with the first end of the tubular member; and
- ejecting means for ejecting a weed plug from the first end of the tubular member, the ejecting means including a handle attached at the second end of the tubular member, a lever pivotally mounted at the handle, a lock plate having an opening formed therein through which the plunger rod projects and a plunger head carried on the first end of the plunger rod, the lever and the lock plate being operatively associated such that, when the lever is pivoted, the lock plate forces the plunger rod towards the first end of the tubular member and the plunger head forces the weed plug out of the tubular member.

In accordance with another feature of the invention, the weed pulling apparatus further comprises a helical spring disposed in the handle and surrounding the plunger rod, the spring biasing the lock plate towards a position substantially perpendicular to the plunger rod for allowing the plunger rod to move freely in the opening formed in the lock plate.

In accordance with a further feature of the invention, a plug of memory material is disposed in the handle in operative engagement with the plunger rod, for defining a frictional force between the handle and the plunger rod.

In accordance with a concomitant feature of the invention, a foot lever is attached to the tubular member for allowing insertion of the first end of the tubular member into the ground by stepping on the foot lever.

Other features which are considered as characteristic for the invention are set forth in the appended claims.

Although the invention is illustrated and described herein as embodied in an improved weed puller with weed ejecting mechanism, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 1 is a partly sectional, side elevational view of the improved weed puller;

FIG. 2 is a partly sectional, front-elevational view of the weed puller; and

FIG. 3 is a partly broken-away elevational view of a lower segment of the weed puller indicating a weed plug which has just been pulled.

DESCRIPTION OF THE PREFERRED EMBODIMENTS

Referring now to the figures of the drawing in detail and first, particularly, to FIG. 1 thereof, there is seen a handle 1 which is rigidly connected with a cylindrical tubular member or tube 2. A plunger rod 3 is disposed centrally in the tube 2 and it is axially movable within the tube 2 and through the handle 1. The handle 1 is preferably formed of two matching halves, which are interconnected by means of fasteners 4. The tube 2 is attached to the handle 1 by means of (metal screw) fasteners 13.

A lever 5 is pivotally connected at the handle 1. The lever 5, upon actuation, engages a lock plate 6 of the ejecting mechanism. The lock plate 6 has an opening formed therein through which the rod 3 extends and it is upwardly biased into a substantially horizontal orientation (perpendicular relative to the plunger rod 3) by a spring 7, referred to as a lock plate spring 7. The lever 5 is pivoted at the handle 1 about a pivot pin 8. The cooperating members 5, 6, 7 and 3 thus form a spring-biased ratchet mechanism.

The end of the tube 2 distally from the handle carries a foot lever 10, which is attached to the tube 2 by means of two fasteners 9. The lower end of the tube 2 to be inserted into the ground will be referred to as a first end and the end of the tube attached to the handle will be referred to as a second end thereof. The tube 2, i.e. the first end thereof, is pushed into the ground by stepping on the foot lever 10. Accordingly, the maximum size of the plug is defined by the inner diameter of the tube and the distance between the lower face of the foot lever 10 and the lower end of the tube 2.

The rod 3 carries a stop 11, which defines the extended position of a threaded eyelet 12 (plunger head) which is threadingly attached at the lower end of the rod 3.

As the tube is forced into the ground—with the weed to be pulled centrally inside the cross-section of the tube—the eyelet 12 abuts the weed and the rod 3 is thus pushed upward. A weed plug 14 of weed and dirt is formed inside the lower segment of the tube 2. As the plug is extracted, the weed with its root 15 is extracted from the ground.

In a preferred embodiment, a plug of memory material 16 is provided in the handle which defines the position and amount of friction between the rod and the handle. The memory material 16 may be formed of rubber or softened PVC.

After the tube 2 with the weed plug 14 has been removed from the ground, the handle-lever mechanism is actuated. As the lever 5 is pivoted, the lock plate 6 inches in a clockwise direction (in FIG. 1) until the opening in the lock plate 6 locks with the rod 3. As the lever is further compressed, the lock plate 6 forces the rod 3 downward, thus ejecting the weed plug 14. Depending on the length of the plug 14, the lever may have to be "pumped" a few times.

Any information not explicitly disclosed in the foregoing description may be found in my prior U.S. Pat. Nos. 4,822,088 and 4,986,588, which are herewith incorporated by reference.

I claim:

1. A weed pulling apparatus, comprising:
   a tubular member having a first end adapted to be inserted into the ground around a weed for forming a weed plug, and a second end;
   a plunger rod longitudinally disposed inside said tubular member and being axially movable within said tubular member, said plunger rod having a first end associated with said first end of said tubular member;
   said plunger rod carrying a plunger head on said first end thereof, and said plunger rod being axially movable from a first position in which said plunger head is substantially aligned with said first end of said tubular member by pushing said first end of said tubular member into the ground to a second position in which said plunger head defines a tubular space with said first end of said tubular member for a weed plug; and
   ejecting means for ejecting the weed plug from said tubular space in said tubular member, said ejecting means including a handle attached at said second end of said tubular member, a lever pivotally mounted at said handle, a lock plate having an opening formed therein through which said plunger rod projects and said plunger head, said lever and said lock plate being operatively associated such that, when said lever is pivoted, said lock plate forces said plunger rod towards said first end of said tubular member and said plunger head forces the weed plug out of said tubular member.

2. The weed pulling apparatus according to claim 1, which further comprises a helical spring disposed in said handle and surrounding said plunger rod, said spring biasing said lock plate towards a position substantially perpendicular to said plunger rod for allowing said plunger rod to move freely in said opening formed in said lock plate.

3. The weed pulling apparatus according to claim 1, which further comprises memory material disposed in said handle in operative engagement with said plunger rod, for defining a frictional force between said handle and said plunger rod.

4. The weed pulling apparatus according to claim 1, which further comprises a foot lever attached to said tubular member for allowing insertion of said first end of said tubular member into the ground by stepping on said foot lever.

5. A weed pulling apparatus, comprising:
   a tubular member having a first end adapted to be inserted into the ground around a weed for forming a weed plug, and a second end;
   a plunger rod longitudinally disposed inside said tubular member and being axially movable within said tubular member, said plunger rod having a first end associated with said first end of said tubular member;
   ejecting means for ejecting a weed plug from said first end of said tubular member, said ejecting means including a handle attached at said second end of said tubular member, a lever pivotally mounted at said handle, a lock plate having an opening formed therein through which said plunger rod projects and a plunger head carried on said first end of said plunger rod, said lever and said lock plate being operatively associated such that, when said lever is pivoted, said lock plate forces said plunger rod towards said first end of said tubular member and said plunger head forces the weed plug out of said tubular member; and
   memory material disposed in said handle in operative engagement with said plunger rod, for defining a frictional force between said handle and said plunger rod.

* * * * *